(12) United States Patent
Kruse et al.

(10) Patent No.: US 10,456,989 B2
(45) Date of Patent: Oct. 29, 2019

(54) FIBER COMPOSITE COMPONENT ASSEMBLY HAVING AT LEAST TWO PLATE-SHAPED COMPOSITE STRUCTURES AND PROCESSES FOR PREPARING SAME

(71) Applicant: Airbus Operations GmbH, Hamburg (DE)

(72) Inventors: Thomas Kruse, Hermannsburg (DE); Paulin Fideu, Stade (DE)

(73) Assignee: Airbus Operations GmbH (DE)

( * ) Notice: Subject to any disclaimer, the term of this patent is extended or adjusted under 35 U.S.C. 154(b) by 322 days.

(21) Appl. No.: 15/388,593

(22) Filed: Dec. 22, 2016

(65) Prior Publication Data
US 2017/0100884 A1    Apr. 13, 2017

Related U.S. Application Data

(62) Division of application No. 13/705,290, filed on Dec. 5, 2012, now abandoned.

(Continued)

(30) Foreign Application Priority Data

Dec. 9, 2011    (DE) .......................... 10 2011 120 636

(51) Int. Cl.
*B29C 65/00*      (2006.01)
*B29C 65/48*      (2006.01)
(Continued)

(52) U.S. Cl.
CPC .............. *B29C 65/72* (2013.01); *B29C 65/48* (2013.01); *B29C 65/564* (2013.01); *B29C 65/62* (2013.01);
(Continued)

(58) Field of Classification Search
CPC ....... B29C 65/48; B29C 65/483; B29C 65/56; B29C 65/562; B29C 65/60; B29C 65/601;
(Continued)

(56) References Cited

U.S. PATENT DOCUMENTS 4,256,790 A * 3/1981 Lackman .............. B29C 66/112
428/73
4,257,835 A * 3/1981 Bompard ................ B29C 70/24
156/155

(Continued)

FOREIGN PATENT DOCUMENTS

DE          10352964 B3    10/2004
DE      102005008252 A1     9/2006
(Continued)

OTHER PUBLICATIONS

Machine Translation of EP 1531035 A1. May 2005.
EP 12 19 5646 Search Report dated Oct. 14, 2016.

*Primary Examiner* — Philip C Tucker
*Assistant Examiner* — Brian R Slawski
(74) *Attorney, Agent, or Firm* — Lerner, David, Littenberg, Krumholz & Mentlik, LLP

(57) ABSTRACT

A method for producing a fiber composite component assembly having at least first and second plate-shaped composite structures made from synthetic resin embedded fibers, the at least first and second fiber composite components having a plurality of partial regions not containing synthetic resin is described. The method includes positioning the at least first and second fiber composite components, the partial regions having been brought to flush conformity with each other, bonding the at least first and second positioned fiber composite components by the adhesive layer arranged in between, placing mechanical reinforcement means through the partial regions, infusing the dry (Continued)

partial regions with synthetic resin, and curing the synthetic resin placed in the partial regions.

18 Claims, 1 Drawing Sheet

Related U.S. Application Data

(60) Provisional application No. 61/568,689, filed on Dec. 9, 2011.

(51) Int. Cl.

| | | |
|---|---|---|
| *B29C 65/56* | (2006.01) | |
| *B29C 65/60* | (2006.01) | |
| *B29C 65/62* | (2006.01) | |
| *B29C 65/72* | (2006.01) | |
| *B32B 3/06* | (2006.01) | |
| *B32B 5/26* | (2006.01) | |
| *B32B 7/08* | (2019.01) | |
| *B32B 37/02* | (2006.01) | |
| *B32B 7/12* | (2006.01) | |
| *B29C 70/84* | (2006.01) | |
| *B32B 5/06* | (2006.01) | |
| *B32B 3/02* | (2006.01) | |

(52) U.S. Cl.
CPC .......... *B29C 66/1122* (2013.01); *B29C 66/21* (2013.01); *B29C 66/3452* (2013.01); *B29C 66/43* (2013.01); *B29C 66/721* (2013.01); *B29C 66/7212* (2013.01); *B29C 66/73752* (2013.01); *B29C 66/73756* (2013.01); *B29C 66/73941* (2013.01); *B29C 70/845* (2013.01); *B32B 3/02* (2013.01); *B32B 3/06* (2013.01); *B32B 5/06* (2013.01); *B32B 5/26* (2013.01); *B32B 7/08* (2013.01); *B32B 7/12* (2013.01); *B32B 37/02* (2013.01); *B29C 66/71* (2013.01); *B32B 2260/021* (2013.01); *B32B 2260/023* (2013.01); *B32B 2260/046* (2013.01); *B32B 2262/106* (2013.01); *B32B 2605/18* (2013.01); *Y10T 428/197* (2015.01); *Y10T 428/24033* (2015.01); *Y10T 428/249923* (2015.04)

(58) Field of Classification Search
CPC ......... B29C 65/62; B29C 65/72; B29C 65/54; B29C 65/542; B29C 66/02; B29C 66/303; B29C 66/30325; B29C 66/30326; B29C 66/304; B29C 66/43; B29C 66/721; B29C 65/564; B29C 66/1122; B29C 66/7394; B32B 5/26; B32B 3/06; B32B 7/08; B32B 2260/023; B32B 2260/046
USPC ...... 156/60, 90, 91, 92, 93, 250, 252, 272.2, 156/275.5, 275.7, 307.1, 307.3; 264/241, 264/249, 257, 258, 154, 155, 156; 244/129.6, 131, 133; 428/57, 102, 103, 428/131, 134, 136, 137, 192, 194, 195.1, 428/198
See application file for complete search history.

(56) References Cited

U.S. PATENT DOCUMENTS

| | | | |
|---|---|---|---|
| 4,709,714 A | * | 12/1987 | Nishino ............... B29C 53/066 134/108 |
| 4,786,343 A | | 11/1988 | Hertzberg |
| 6,450,450 B1 | | 9/2002 | MacDonald et al. |
| 2008/0274322 A1 | * | 11/2008 | Kaps ..................... B29C 65/02 428/57 |
| 2010/0304170 A1 | * | 12/2010 | Frederiksen ........... B29C 65/40 428/542.8 |
| 2013/0149501 A1 | | 6/2013 | Pacchione et al. |

FOREIGN PATENT DOCUMENTS

| | | | | |
|---|---|---|---|---|
| DE | 102006041653 A1 | | 2/2008 | |
| DE | 102008063651 A1 | * | 7/2010 | ......... B29C 65/5057 |
| DE | 102009047671 A2 | | 6/2011 | |
| EP | 1316409 A1 | | 6/2003 | |
| EP | 1531035 A1 | | 5/2005 | |
| GB | 1515678 A | * | 6/1978 | .......... B29C 65/562 |
| GB | 2238977 A | | 6/1991 | |
| JP | 04135720 A | * | 5/1992 | ............ B29C 65/02 |
| JP | 2001252985 A | * | 9/2001 | |
| JP | 2002011795 A | * | 1/2002 | .......... B29C 65/483 |
| WO | 2003024700 A2 | | 3/2003 | |
| WO | 2011069899 A2 | | 6/2011 | |

* cited by examiner

FIBER COMPOSITE COMPONENT ASSEMBLY HAVING AT LEAST TWO PLATE-SHAPED COMPOSITE STRUCTURES AND PROCESSES FOR PREPARING SAME

CROSS-REFERENCE TO RELATED APPLICATIONS

This application is a divisional of U.S. application Ser. No. 13/705,290, filed on Dec. 5, 2012, which claims the benefit of the filing date of U.S. Provisional Patent Application No. 61/568,689 filed Dec. 9, 2011, the disclosures of which are hereby incorporated herein by reference.

TECHNICAL FIELD

The invention relates to a fiber composite component assembly having at least two plate-shaped composite structures which in each case are made from synthetic-resin-embedded fibers and are integrally interconnected by way of an adhesive layer, arranged in-between, and additional mechanical reinforcement means. Furthermore, the invention also relates to a method for producing such a fiber composite component assembly.

The field of application of the invention relates predominantly to aircraft construction. In particular in the production of structural components for aircraft fuselages and the like, plate-shaped fiber composite components can be used. Specifically, in this field carbon-fiber reinforced plastics (CFPs) are increasingly used, in which the carbon fibers, which are usually present in the form of an interlaid scrim, are embedded in a plastic matrix in a multilayer arrangement as reinforcement. The plastic matrix usually comprises duromers, for example epoxy resin. In the use of such fiber composite materials in the production of structural components, stiffening elements, such as stringers or frame elements, are also integrated in the structural component during production. The plate-shaped fiber composite components produced in this manner are, for example, to be interconnected to form a fuselage segment.

BACKGROUND OF THE INVENTION

For the connection of plate-shaped fiber composite components, according to the generally-known state of the art, in addition to bonding of the fiber composite components on the edge region, additional mechanical securing of the connection seam can be carried out, which securing can be implemented in the form of rivet connections.

Rivet connections carry out various functions. For example, peeling loads at the end of stiffening elements, for example stringers, are absorbed, which additionally ensures damage-tolerant behavior of the connection, in order to additionally safeguard the bonded connection.

In the use of fiber composite components whose fibers comprise carbon, riveting for additional reinforcement of the connection is problematic because CFP is not an isotropic material, and thus a quasi-isotropic layer structure is needed to achieve adequate strength of the hole walls for riveting. Furthermore, because of the drilling dust arising during riveting, all riveting work needs to be completed prior to commencement of system installation, which increases production expenditure.

On the other hand, other generally-known alternative mechanical reinforcement means, for example pin connections, sewn connections and the like, cannot be placed in already-cured fiber composite components, and therefore they have so far been limited to use in individual components or large-format integral structures.

DE 10 2005 008 252 A1 shows a fiber composite component assembly between two plate-shaped fiber composite components, which fiber composite component assembly instead of conventional mechanical reinforcement means such as rivet connections, pin connections or sewn connections utilizes an additional positive-locking connection between the two plate-shaped fiber composite components in order to additionally secure the primary, bonded, connection.

A fiber composite component assembly with two plate-shaped fiber composite components that have different curing properties can be produced with the desired improved connection stability in that additionally the plastic matrix of the one fiber composite component is liquefied and thus irregularly penetrates the region of the other fiber composite component. Subsequently the plastic matrix of the other fiber composite component is liquefied, after which both fiber composite components are cured. This results in irregular interfaces at the connection area that creates an indentation connection or a hook-type connection of the two fiber composite components relative to each other, and consequently a connection area providing greater shearing strength is created.

However, since this technical solution is primarily based on an increase in the shearing strength, its use is limited to special applications that require such increased shearing strength of an adhesive connection between two plate-shaped fiber composite components.

BRIEF SUMMARY OF THE INVENTION

An aspect of the invention, provides in a simple manner from the point of view of production technology, to additionally mechanically secure an integral connection, primarily established by bonding, between two plate-shaped composite components to produce a fiber composite component assembly, in order to ensure high tolerance to loads and damage, of the bonded connection area.

Various aspect of the invention incorporate the technical teaching according to which the fiber composite components comprise several partial regions that do not contain synthetic resin, which partial regions can be brought to flush conformity with each other and which are arranged so as to be spaced apart from each other, through which partial regions reinforcement means can subsequently be passed.

In other words, the solution according to an aspect of the invention allows the local placement of mechanical reinforcement means, which per se are utilized for non-cured fiber composite components, into already cured fiber composite components without this massively influencing the handling of the fiber composite components in the assembly process as would be the case in completely non-cured fiber component components.

In principle, for the purpose of placing the local mechanical reinforcement means in the region of the connection area between the two plate-shaped fiber composite components, curing of the fiber composite with the synthetic resin is locally prevented in order to first place the mechanical reinforcement means into these partial regions that do not contain synthetic resin, after which the infusion of the dry partial regions with synthetic resin and subsequent curing takes place.

The partial regions, which in their initial state are dry, can, for example, be produced by the insertion of a filler during production of the fiber composite component from fibers and plastic material. Apart from this, pressing-over a dry preform, thermal treatment and flow-front management during the infusion process, or other measures adapted to the respective production process, are imaginable.

Preferably, each partial region that does not contain synthetic resin, of the fiber composite components, is fully enclosed by a cured region of the fiber composite component, thus forming a rectangular or oval to round shape. Apart from this it is, however, also imaginable for the partial areas that do not contain synthetic resin largely to be enclosed by the cured region of the fiber composite component in order to implement the above-described advantages according to the invention. Furthermore, it is also imaginable for the partial regions that do not contain synthetic resin to have an irregular shape or to comprise undercuts to the adjacent cured region in order to improve the stability of the connection. Thus, uncontrolled felting or tangling of the individual fibers or fiber strands of the partial region that does not contain synthetic resin is effectively prevented, and the fiber alignment in this region is fixed. A partial region that does not contain synthetic resin, which partial region is fully enclosed by a cured region of the fiber composite component, further causes a structurally and mechanically effective reinforcement that makes it possible to achieve non-critical handling of the fiber composite component during installation. As an optional geometric design partial infusion in the direction of thickness, and curing with synthetic resin are also imaginable.

In terms of additional mechanical reinforcement means, predominantly pins for forming a pin connection are used. Apart from this it is also possible to implement the additional mechanical reinforcement means as threads to form a sewn connection. In principle, any mechanical reinforcement means are suitable that can be used for connecting non-cured fiber composite components.

According to a preferred embodiment, the two plate-shaped fiber composite components are joined in the form of an overlap connection, wherein the partial regions that do not contain synthetic resin are arranged in series and are positioned, relative to the fiber composite component, with an edge spacing a to the component edge and with a web spacing b between each other. By means of the edge spacing a and the web spacing b of the series of partial regions that do not contain synthetic resin, in a simple manner the degree of the additional mechanical reinforcement and the robustness of the edge region can be adapted to the design requirements. An individual definition of the balance between a necessary requirement of dry partial regions and the robustness can be defined in a simple manner by way of the size of the cured edge regions a and the width of the web connection b.

Preferably, the fiber composite components to be interconnected are designed as textile infusion components. However, it is also possible to use the solution according to the invention in conjunction with pre-impregnated fiber composite materials, so-called prepregs.

BRIEF DESCRIPTION OF THE DRAWINGS

Further measures that improve the invention are shown in further detail below, together with the description of a preferred exemplary embodiment, with reference to the figures.

The following are shown.

DETAILED DESCRIPTION

Figure 1:
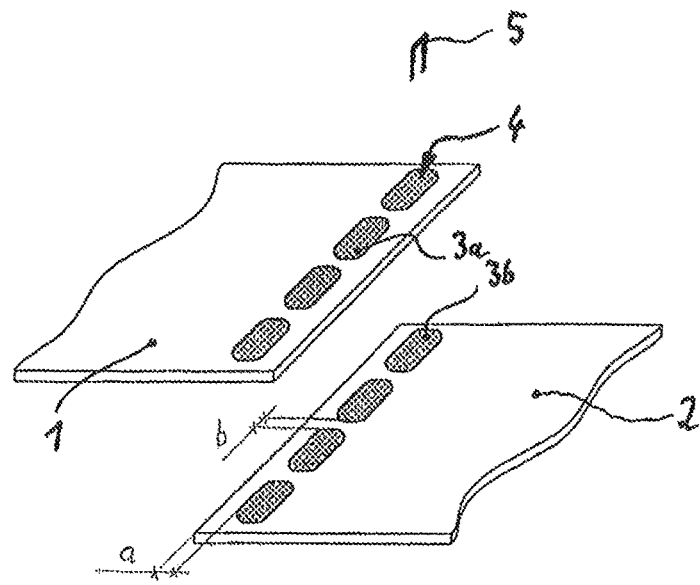
FIG. 1 a perspective diagrammatic view of two fiber composite components to be interconnected, and FIG. 2 a cross section of the interconnected fiber composite components for producing a fiber composite component assembly.

According to FIG. 1 two plate-shaped composite components 1 and 2 of an aircraft structure (not shown in detail) in the edge region comprise several partial regions 3a or 3b which can be brought to flush conformity with each other and which are arranged so as to be spaced apart from each other. While the fiber composite components 1 and 2 outside these partial regions 3a and 3b are cured, only fibers 4 without a plastic matrix extend through the partial regions 3a and 3b.

This forms a prerequisite for the two plate-shaped fiber composite components 1 and 2 to be interconnected during installation, by way of additional mechanical reinforcement means in the form of pins 5, in addition to bonding. In this embodiment each partial region 3a, 3b that does not contain synthetic resin is completely enclosed by a cured region of the fiber composite component 1 or 2, thus in each case forming an essentially rectangular region. The partial regions 3a and 3b that do not contain synthetic resin are in each case arranged in series to each other with an edge spacing a and a web spacing b.

Figure 2:
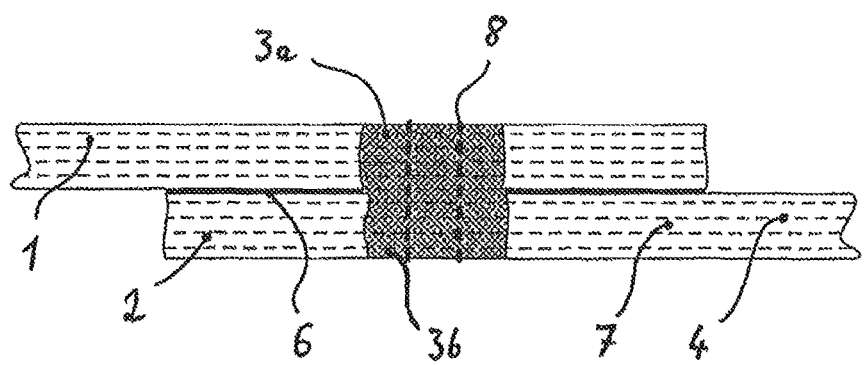

According to FIG. 2 the two plate-shaped fiber composite components 1 and 2 are joined in the form of an overlap connection. Primarily, the two fiber composite components are integrally interconnected by way of an adhesive layer 6 arranged in-between. The adhesive layer 6 acts between the respectively cured regions of the fiber composite components 1 and 2 that are arranged around the partial regions 3a and 3b that do not contain synthetic resin. The cured regions of the fiber composite components 1 and 2 comprise fibers embedded in synthetic resin 7, in the present embodiment carbon fibers, and consequently the fiber composite components 1 and 2 are carbon-fiber reinforced composite components.

In the embodiment of the fiber composite component assembly shown, the partial regions 3a and 3b that do not contain synthetic resin are designed by way of mechanical reinforcement means in the form of threads 8 to form a sewn connection.

For producing the fiber composite component assembly the two fiber composite components 1 and 2 are first positioned relative to each other in that the partial regions 3a and 3b that do not contain synthetic resin, which regions have respectively been placed therein, are brought to flush conformity with each other. In this process the two fiber composite components 1 and 2 are integrally connected by way of an adhesive layer 6 arranged in the overlap region between the cured component regions.

Subsequently, the mechanical reinforcement means are fed through the partial regions 3a and 3b that do not contain synthetic resin, in order to produce the additional mechanical connection. Finally, the dry partial regions 3a and 3b are also provided with synthetic resin, namely in an infusion process. After the synthetic resin placed in the partial regions 3a and 3b has been cured, a secure integral and mechanical connection between the two fiber composite components 1 and 2 has been produced.

The partial regions 3a and 3b, which in the initial state are dry, can be produced by inserting a filler during the production of the fiber composite components 1 and 2 from fibers 4 and synthetic resin 7.

In addition, it should be pointed out that "comprising" does not exclude other elements or steps, and "a" or "one" does not exclude a plural number. Furthermore, it should be pointed out that characteristics or steps which have been described with reference to one of the above exemplary embodiments can also be used in combination with other characteristics or steps of other exemplary embodiments described above. Reference characters in the claims are not to be interpreted as limitations.

LIST OF REFERENCE CHARACTERS

1 First fiber composite component
2 Second fiber composite component
3 Partial region that does not contain synthetic resin
4 Fibers
5 Pins
6 Adhesive layer
7 Synthetic resin
8 Threads
a Wall spacing
b Web spacing

The invention claimed is:

1. A method for producing a fiber composite component assembly having at least first and second plate-shaped composite structures made from synthetic resin embedded fibers, the at least first and second fiber composite components having a plurality of partial regions not containing synthetic resin in an initial state, the plurality of partial regions extending from a top surface to a bottom surface of the respective first and second fiber composite components, the method comprising:
    positioning the at least first and second fiber composite components, the partial regions having been brought to flush conformity with each other,
    bonding the at least first and second positioned fiber composite components by an adhesive layer arranged in between,
    placing mechanical reinforcement means through the partial regions,
    infusing the plurality of partial regions not containing synthetic resin in the initial state with synthetic resin, and
    curing the synthetic resin placed in the plurality of partial regions not containing synthetic resin in the initial state.

2. The method of claim 1, wherein each of the plurality of partial regions not containing synthetic resin in the initial state is enclosed by a cured region of the fiber composite component.

3. The method of claim 1, wherein each of the plurality of partial regions is essentially rectangular or oval to round in shape.

4. The method of claim 1, wherein the mechanical reinforcement means are configured as pins to form a pin connection.

5. The method of claim 1, wherein the mechanical reinforcement means are configured as threads to form a sewn connection.

6. The method of claim 1, wherein the plurality of partial regions not containing synthetic resin in the initial state, are produced by inserting a filler during the production of the fiber composite components from fibers and synthetic resin.

7. A method for producing a fiber composite component assembly having at least first and second plate-shaped composite structures made from synthetic resin embedded fibers, the at least first and second fiber composite components having a plurality of partial regions not containing synthetic resin in an initial state, the method comprising:
    positioning the at least first and second fiber composite components, the plurality of partial regions not containing synthetic resin having been brought to flush conformity with each other,
    bonding the at least first and second positioned fiber composite components by an adhesive layer arranged in between,
    placing mechanical reinforcement means through the plurality of partial regions not containing synthetic resin in the initial state,
    infusing the plurality of partial regions not containing synthetic resin in the initial state with synthetic resin, and
    curing the synthetic resin placed in the plurality of partial regions not containing synthetic resin in the initial state,
    wherein the plurality of partial regions not containing synthetic resin in the initial state is produced by inserting a filler during the production of the fiber composite components from fibers and synthetic resin.

8. The method of claim 7, wherein each of the plurality of partial regions not containing synthetic resin in the initial state is enclosed by a cured region of the fiber composite component.

9. The method of claim 7, wherein each of the plurality of partial regions not containing synthetic resin in the initial state is essentially rectangular or oval to round in shape.

10. The method of claim 7, wherein the mechanical reinforcement means are configured as pins to form a pin connection.

11. The method of claim 7, wherein the mechanical reinforcement means are configured as threads to form a sewn connection.

12. The method of claim 7, wherein the plurality of partial regions not containing synthetic resin in the initial state is arranged in series with an edge spacing and a web spacing.

13. A method for producing a fiber composite component assembly having at least first and second plate-shaped composite structures made from synthetic resin embedded fibers, the at least first and second fiber composite components having a plurality of partial regions not containing synthetic resin in an initial state, the method comprising:
    positioning the at least first and second fiber composite components, the plurality of partial regions not containing synthetic resin in the initial state having been brought to flush conformity with each other,
    bonding the at least first and second positioned fiber composite components by an adhesive layer arranged in between,
    placing mechanical reinforcement means through the plurality of partial regions not containing synthetic resin in the initial state,
    infusing the plurality of partial regions not containing synthetic resin in the initial state with synthetic resin, and
    curing the synthetic resin placed in the plurality of partial regions not containing synthetic resin in the initial state,
    wherein the plurality of partial regions not containing synthetic resin in the initial state is arranged in series with an edge spacing and a web spacing.

14. The method of claim 13, wherein the plurality of partial regions not containing synthetic resin in the initial state, are produced by inserting a filler during the production of the fiber composite components from fibers and synthetic resin.

15. The method of claim 13, wherein each of the plurality of partial regions not containing synthetic resin in the initial state is enclosed by a cured region of the fiber composite component.

16. The method of claim 13, wherein each of the plurality of partial regions not containing synthetic resin in the initial state is essentially rectangular or oval to round in shape.

17. The method of claim 13, wherein the mechanical reinforcement means are configured as pins to form a pin connection.

18. The method of claim 13, wherein the mechanical reinforcement means are configured as threads to form a sewn connection.

\* \* \* \* \*